US012786870B2

(12) United States Patent
Mitra et al.

(10) Patent No.: US 12,786,870 B2
(45) Date of Patent: Nov. 3, 2026

(54) ENERGY EFFICIENT LINK ADAPTATION

(71) Applicant: Dell Products L.P., Round Rock, TX (US)

(72) Inventors: Jeebak Mitra, Ottawa (CA); Gwenael Poitau, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 278 days.

(21) Appl. No.: 18/655,586

(22) Filed: May 6, 2024

(65) Prior Publication Data

US 2025/0344147 A1 Nov. 6, 2025

(51) Int. Cl.
*H04W 52/02* (2009.01)
*H04W 28/02* (2009.01)

(52) U.S. Cl.
CPC ... *H04W 52/0212* (2013.01); *H04W 28/0268* (2013.01); *H04W 28/0278* (2013.01)

(58) Field of Classification Search
CPC ......... H04W 52/0212; H04W 28/0268; H04W 28/0278
See application file for complete search history.

(56) References Cited

U.S. PATENT DOCUMENTS

2004/0063406 A1* 4/2004 Petrus .................. H04L 1/0015 455/67.11
2008/0273490 A1* 11/2008 Sayana ..................... H04L 1/06 370/329
2011/0292911 A1* 12/2011 Uemura .......... H04W 36/00725 370/331

(Continued)

FOREIGN PATENT DOCUMENTS

KR 101097652 * 12/2011
WO WO-2024165147 A1 * 8/2024 ........ H04W 28/0284

OTHER PUBLICATIONS

Mclaughlin, et al. "Techniques for improving cellular radio base station energy efficiency", IEEE Wireless Commun., vol. 18, No. 5, Oct. 2011, 8 pages.

(Continued)

*Primary Examiner* — Sudesh M. Patidar

(74) *Attorney, Agent, or Firm* — Amin, Turocy & Watson, LLP

(57) ABSTRACT

Energy efficient link adaptation (e.g., using a computerized tool), is enabled. For example, a system can comprise at least one processor and at least one memory that stores executable instructions that, when executed by the processor, facilitate performance of operations. The operations can comprise, for a communication link between network equipment and a user equipment, modeling network equipment power consumption applicable to the network equipment and modeling user equipment power consumption applicable to the user equipment, based on at least one model resulting from the modeling of the network equipment power consumption and the modeling of the user equipment power consumption, determining a link energy efficiency applicable to the communication link, and based on the link energy efficiency, performing link adaptation comprising modifying a set of link transmission parameters applicable to the communication link, wherein the modifying has been determined to increase the link energy efficiency.

20 Claims, 10 Drawing Sheets

(56) References Cited

U.S. PATENT DOCUMENTS

| | | | | |
|---|---|---|---|---|
| 2015/0334653 | A1* | 11/2015 | Ang | H04W 28/0221 370/311 |
| 2017/0318604 | A1* | 11/2017 | Liu | H04L 1/0003 |
| 2018/0049182 | A1* | 2/2018 | Luo | H04W 72/51 |
| 2018/0270758 | A1* | 9/2018 | Kang | H04B 7/0417 |
| 2020/0015125 | A1* | 1/2020 | Chen | H04B 7/0413 |
| 2023/0156625 | A1* | 5/2023 | Liu | H04W 52/146 455/522 |
| 2023/0379960 | A1* | 11/2023 | Ganguly | H04L 5/14 |
| 2024/0090014 | A1* | 3/2024 | Loehr | H04W 72/1268 |
| 2024/0187991 | A1* | 6/2024 | Rydén | H04W 24/10 |

OTHER PUBLICATIONS

Auer, et al. "How much energy is needed to run a wireless network?" IEEE Trans. Wireless Commun., vol. 18, No. 5, Oct. 2011, 10 pages.

Han, et al. "Green Radio: Radio Techniques to Enable Energy-Efficient Wireless Networks" IEEE Communications Magazine, May 2011, 9 pages.

* cited by examiner

ENERGY EFFICIENT LINK ADAPTATION

BACKGROUND

The advent of fifth generation (5G) wireless networks presents opportunities for high-speed communication through use of various advanced features. In that regard, a stringent set of quality of service (QoS) requirements for various use cases of 5G have been brought forth that system designers need to satisfy within the constraints of the standard specifications. Due to the high cost of acquisition of transmission spectrum for mobile network operators (MNOs), and the critical dependence of average revenue per user (ARPU), QoS provision and efficient spectrum utilization are thus important in mobile communication systems. Choosing the correct set of parameters (e.g., to enable such communications) is a key determinant of the network throughput. Link adaptation is typically performed to maximize data rate, reliability, and spectral efficiency of a communication link.

The above-described background relating to mobile networks is merely intended to provide a contextual overview of some current issues and is not intended to be exhaustive. Other contextual information may become further apparent upon review of the following detailed description.

DETAILED DESCRIPTION

Figure 1:
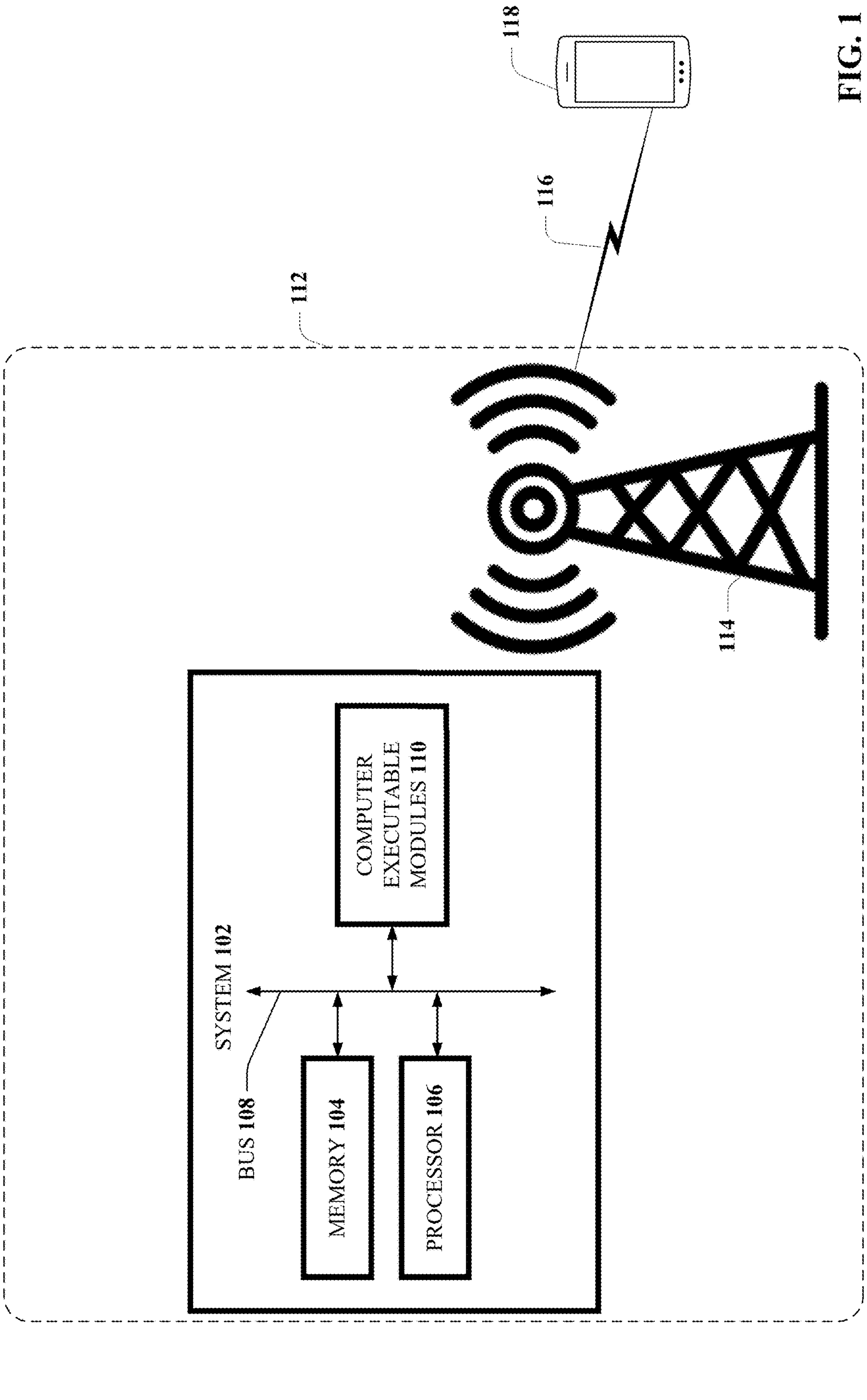
FIG. 1 is a block diagram of a non-limiting example system in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, link adaptation can be improved in various ways, and various embodiments are described herein to this end and/or other ends. The disclosed subject matter relates to link adaptation and, more particularly, to energy efficient link adaptation.

Link adaptation (LA), in combination with efficient scheduling strategies, form the basis of optimal network operations. Energy efficiency has not previously been considered as part of the optimal network operational strategy and the primary focus has been on throughput maximization. Various embodiments herein enable achievement of optimal LA for 5G new radio (NR) systems, and beyond, with reduced energy consumption.

The 5G NR standard incorporates a host of features in order to improve throughput, coverage, and features that enable the diversity of use cases that are supported. For instance, 5G features can be implemented on top of fourth generation (4G) core, e.g., non-stand-alone (NSA) mode, as well as a fully independent 5G only mode, e.g., stand-alone (SA) mode, which comprises full benefits of various advanced 5G features. Fundamentally, however, such advanced features reinstate the focus on the core functionalities within a communications link, such as link adaptation. In cellular communication, in particular, the base station (BS) (e.g., a gNodeB) is responsible for choosing the most appropriate modulation and coding scheme (MCS) for a user equipment (UE) to use to maximize resource utilization, given measures of the channel quality. As compared to 4G, 5G and beyond networks have a much higher dimensionality of parameters with wider bandwidth, greater number of antenna ports, use of multiuser-multiple-input and multiple-output (MU-MIMO) modes, beamforming, etc. Thus, relying on just a single representative metric for estimation of channel quality for the link between a BS and UE is no longer an optimal approach to perform link adaptation, and there is thus a need to determine formulations that are more reflective of the complex link design problem and the plethora of dependencies that exist in terms of characterizing links to choose the best link parameters for transmission based on a certain demand made by UEs.

One of the key pillars of 5G has been flexibility in the configuration of the radio access network (RAN), such that various use cases characterized by enhanced mobile broadband (eMBB), ultra-reliable low latency communications (uRLLC), and massive machine-type communications (mmTC) requirements can be accommodated. An effective link adaptation methodology is crucial for realizing the benefits of 5G NR, which includes global metrics such as increased cell throughput, as well as per UE metrics, such as target data rates, latency, and reliability.

Generally, the MCS can be adjusted based on the channel conditions represented by pertinent metrics such as the signal-to-noise-and-interference ratio (SINR). Specifically, the downlink SINR is typically estimated by the UE from the channel state information reference signal (CSI-RS) and reported back to the BS via the channel quality indicator (CQI) field as part of the channel state information (CSI) report. Additionally, the UE often also reports the rank indicator (RI), and the precoding matrix indicator (PMI) for MIMO transmission. The rank, i.e., the number of layers, and the precoding matrix, are adapted as per the time-based variations of the equivalent MIMO channel. Rank adaptation attempts to select the transmission matrix dimensions that are best suited to the rank of the channel matrix H, i.e., the maximum number of independent streams that can be transmitted. The BS (e.g., gNodeB) can determine the transmission rank for the downlink (DL) data based on link conditions, for instance, selecting between spatial multiplexing, transmit diversity, or digital beamforming. For TDD channels, channel reciprocity can be assumed, for instance, so the rank and precoding matrix on the DL can also be based on the channel estimation performed based on the uplink (UL) sounding reference signal (SRS). The UE, as part of its own feedback to the BS, can select the precoding matrix from the standards-based codebooks, and can report the related rank indicator (RI) and precoding matrix indicator (PMI). The CQI, RI, and the PMI value can be used for the MCS selection, for instance, to transmit DL data on the subsequent DL slots.

For 5G transmission, the task of selecting optimal transmission parameters based on link conditions is significantly more difficult, for instance, due to the need for a multi-domain adaptation technique in which new aspects, such as numerology and multi-beam transmission, MCS, multiple antenna precoding, need to be considered to adapt transmit power etc. to the instantaneous link conditions. There are some inherent features incorporated in the 5G standard to reduce computational demands on the UE, for example, to cope with wide bandwidths—the concept of active bandwidth part (BWP) has been introduced in which only a part of the carrier bandwidth can be dynamically selected for active data reception and transmission by the UE. Similarly, MCS selection has also been revamped, for instance, to cope with different waveforms and performance targets, like maximum throughput or minimum block error rate (BLER), leading to several MCS tables depending on the working conditions.

Nonetheless, introduction of these new degrees of freedom increases the overall complexity on LA, for instance, since more parameters need to be jointly optimized, catering to the propagation and channel conditions expected for 5G and beyond and pose challenges to LA. Adding energy efficiency into this equation of finding the best set of parameters, for a high-throughput MIMO—orthogonal frequency-division multiplexing (OFDM) system, makes the problem even harder to solve using conventional techniques, such as convex optimization, and brute force search methods are extremely computationally prohibitive. Moreover, the problem requires a delicate coordination between several layers within the wireless networking stack, as different parameters are set at different levels.

According to an example embodiment, a system can comprise at least one processor, and at least one memory that stores executable instructions that, when executed by the processor, facilitate performance of operations, comprising for a communication link between network equipment and a user equipment, modeling network equipment power consumption applicable to the network equipment and modeling user equipment power consumption applicable to the user equipment, based on at least one model resulting from the modeling of the network equipment power consumption and the modeling of the user equipment power consumption, determining a link energy efficiency applicable to the communication link, and based on the link energy efficiency, performing link adaptation comprising modifying a set of link transmission parameters applicable to the communication link, wherein the modifying has been determined to increase the link energy efficiency.

In one or more example embodiments, the link energy efficiency can comprise a quantity of successfully transmitted bits per energy unit consumed.

In one or more example embodiments, the link adaptation can be determined to satisfy a defined throughput constraint applicable to the communication link. In this regard, the defined throughput constraint can comprise a defined throughput threshold determined to satisfy a defined latency constraint.

In one or more example embodiments, the link adaptation can be determined to satisfy a defined block error rate constraint applicable to the communication link. In this regard, the defined block error rate constraint can comprise a maximum permitted instantaneous block error rate.

In one or more example embodiments, the set of link transmission parameters can be modified based on an eigenvalue decomposition of an estimated channel matrix applicable to the communication link, and the performing the link adaptation can comprise performing rank adaptation using eigenvalues generated via the eigenvalue decomposition.

In one or more example embodiments, the above operations can further comprise estimating a channel applicable to the communication link based on staggered sounding reference signals and demodulation reference signals.

In one or more example embodiments, the above operations can further comprise determining a cumulative energy consumption metric, wherein the cumulative energy consumption metric is determined based on a highest suitable modulation and coding scheme to empty a traffic buffer applicable to the user equipment, and based on the cumulative energy consumption metric, determining a frequency of the performing the link adaptation.

In one or more example embodiments, the link adaptation for the communication link can be performed further based on a channel quality indicator applicable to the communication link.

In one or more example embodiments, the link adaptation for the communication link is performed further based on a buffer status report of a traffic buffer applicable to the user equipment, and the modeling of the user equipment power consumption can be based on a predicted energy requirement determined to empty the traffic buffer.

In another example embodiment, a non-transitory machine-readable medium can comprise executable instructions that, when executed by a processor, facilitate performance of operations, comprising, for a communication link between network equipment and a user equipment, modeling network equipment power consumption applicable to the network equipment and modeling user equipment power consumption applicable to the user equipment, based on the modeling of the network equipment power consumption and the modeling of the user equipment power consumption, determining a link energy efficiency applicable to the communication link, and to increase the link energy efficiency, facilitating link adaptation comprising modifying a group of link transmission parameters applicable to the communication link.

In one or more example embodiments, the link energy efficiency can comprise a quantity of successfully transmitted bits per energy unit consumed.

In one or more example embodiments, the link adaptation can be determined to satisfy a defined throughput constraint applicable to the communication link. In this regard, the defined throughput constraint can comprise a defined throughput threshold determined to satisfy a defined latency constraint.

In one or more example embodiments, the link adaptation can be determined to satisfy a defined block error rate constraint applicable to the communication link. In this regard, the defined block error rate constraint can comprise a maximum permitted instantaneous block error rate.

In yet another example embodiment, a method can comprise, for a communication link between network equipment and a user device, modeling, by a system comprising at least one processor, network equipment power consumption applicable to the network equipment and modeling, by the system, user device power consumption applicable to the user device, resulting in at least one model, using the at least one model, determining, by the system, a link energy efficiency applicable to the communication link, and based on the link energy efficiency and to increase the link energy efficiency, facilitating, by the system, link adaptation, wherein facilitating the link adaptation comprises modifying at least one link transmission parameter applicable to the communication link.

In one or more example embodiments, the at least one link transmission parameter can be modified based on an eigenvalue decomposition of an estimated channel matrix applicable to the communication link.

In one or more example embodiments, the above method can further comprise estimating, by the system, a channel applicable to the communication link based on staggered sounding reference signals and demodulation reference signals.

Turning now to FIG. 1, there is illustrated an example, non-limiting system 102 (e.g., a link adaptation module) in accordance with one or more example embodiments herein. System 102 can comprise a computerized tool, which can be configured to perform various operations relating to energy efficient link adaptation. The system 102 can comprise one or more of a variety of modules, such as memory 104, processor 106, bus 108, and/or computer executable modules 110. In various embodiments, one or more of the memory 104, processor 106, bus 108, and/or computer executable modules 110 can be communicatively or operably coupled (e.g., over a bus or wireless network) to one another to perform one or more functions of the system 102. In various embodiments, the system 102 can comprise and/or be part of a gNodeB (e.g., a base station) 112, which can comprise one or more of antenna 114. In various embodiments, the gNodeB 112 can be communicatively coupled to a user equipment (UE) 118, for instance, via a communication link 116.

Figure 2:
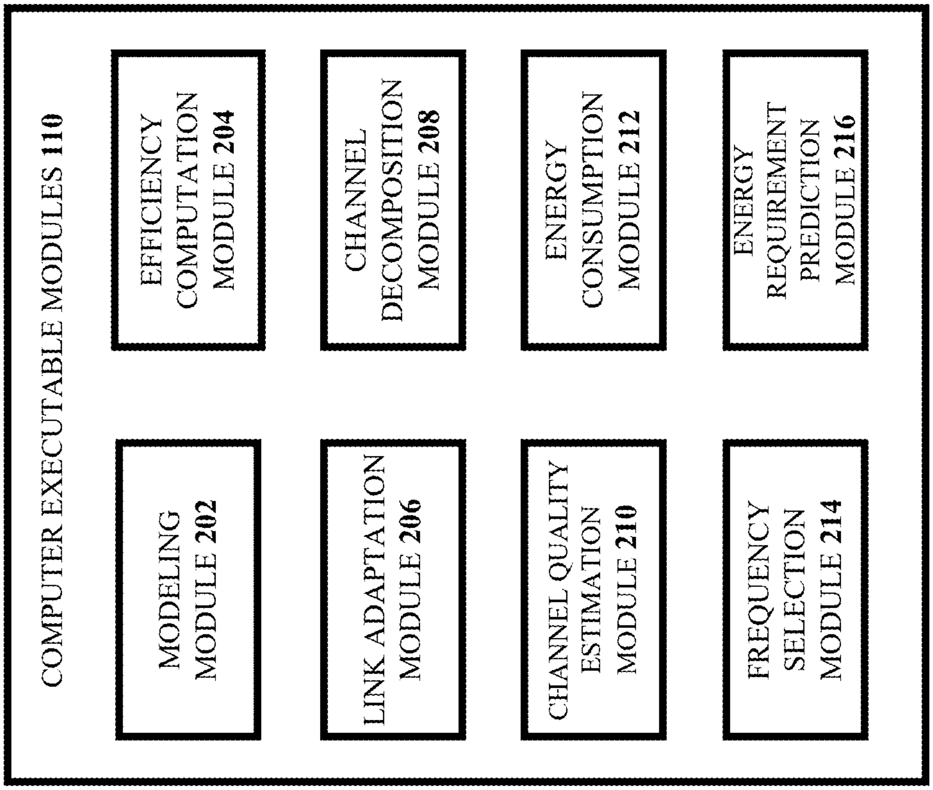
FIG. 2 is a block diagram of a non-limiting example computer executable modules in accordance with one or more example embodiments described herein.

FIG. 2 illustrates a block diagram of example, non-limiting computer executable modules 110 that can facilitate energy efficient link adaptation in accordance with one or more embodiments described herein. Repetitive description of like elements employed in other embodiments described herein is omitted for sake of brevity. As shown in FIG. 2, the one or more computer executable modules 110 can comprise modeling module 202, efficiency computation module 204, link adaptation module 206, channel decomposition module 208, channel quality estimation module 210, energy consumption module 212, frequency selection module 214, and/or energy requirement prediction module 216.

In order to reduce the energy consumption of the link, various embodiments herein can model the energy consumption of the link accurately, such that the primary contributing factors are captured. In this regard, in various embodiments, the modeling module 202 can, for a communication link (e.g., communication link 116) between network equipment (e.g., gNodeB 112) and a user equipment (e.g., UE 118), model network equipment power consumption applicable to the network equipment (e.g., gNodeB 112) and model user equipment power consumption applicable to the user equipment (e.g., UE 118).

In various embodiments, the modeling module 202 can determine the energy consumed at the BS (e.g., gNodeB 112) in transmitting data in subframe in a given interval and the energy expended by a UE (e.g., UE 118) in receiving the subframe. In an OFDM system, for instance, the user (e.g., UE) data is loaded in the frequency domain and the signal is transmitted through the RF chain in the time domain, and thus has a cumulative effect of the data loading of all user equipment.

Transmitter (BS) (e.g., gNodeB 112) power modeling (e.g., via the modeling module 202):

each BS (e.g., gNodeB 112) has a fixed portion of power consumption and a traffic load dependent portion, and various aspects of various embodiments herein do not affect fixed power consumption, as that is a function of the equipment design. In various embodiments herein, the power consumption of a given BS is traffic dependent, and is given by:

$$P = P_{fixed} + P_{Tr-dep} \quad \text{(Equation 1)}$$

$P_{fixed}$ is the fixed power consumption of the BS when carrying no traffic and includes the impact of both baseband power consumption $P_{BB}$ and the fixed RF power expended in keeping the RF circuits powered up and ready for carrying traffic $P_{RF\text{-}fixed}$, implying:

$$P_{fixed} = P_{BB-fixed} + P_{RF-fixed} \quad \text{(Equation 2)}$$

Furthermore, the traffic dependent part can be split into $$P_{Tr-dep} = P_{BB-Tr}(\gamma) + P_{RF-Tr}(\gamma) \quad \text{(Equation 3)}$$

with $$P_{RF\text{-}Tr}(\varphi) = N_t * [\frac{1}{(1+\epsilon)\theta}(\varphi + \epsilon P_{max,PA})]$$

and the following notations hold

θ–Maximum efficiency of PA $N_{PRB}$–Number of physical resources blocks as per 3rd generation partnership project (3GPP) definition.

The maximum power amplifier (PA) efficiency is achieved when transmitting maximum output power $P_{max,\ PA}$ with φ being the load on the PA in terms of the total physical resource block (PRB) utilization whereby $$\varphi = \frac{N_{PRB\text{-}used}}{N_{PRB\text{-}total}},\ 0 \le \varphi \le 1.$$

Receiver (e.g., UE 118) power modeling (e.g., via the modeling module 202):

with respect to MIMO processing for transmit on the BS (e.g., gNodeB 112) side, encoding with a precoding matrix can be implemented relatively cheaply (from a computational perspective) using a parallel array of scalar multiply and shift operations. The UE (e.g., UE 118) receiver MIMO processing is more complex, and since the UE is more power-constrained than the BS, it can be a crucial determinant of which MIMO mode to use as well. The MIMO processing complexity can be dependent on the MIMO decoder processing approach e.g., zero forcing (ZF), minimum mean squared error (MMSE) decoding of for high-performance UEs using sub-optimal ML approaches such as K-best decoder etc. Power consumed by the UE can be written as $$P_{UE} = f_{MIMO}(N_t, N_r, \rho) + f_{DEC}(\sigma) \quad \text{(Equation 4)}$$

where:

$f_{MIMO}$ is a function mapping the chosen parameters to the energy consumption of the MIMO decoder and $f_{DEC}$ is an analogous function that does the same for the FEC decoder and is thus dependent on the coding rate $\sigma$.

The energy consumption model, as captured via the modeling module 202 using Equation 1 through Equation 4 above, present a comprehensive energy consumption model that can be utilized herein (e.g., via the modeling module 202) to compute the energy efficiency herein. It is noted that, in some embodiments, the UE power consumption is not considered as part of the optimization objective.

In various embodiments, the efficiency computation module 204 can, based on at least one model resulting from the modeling of the network equipment (e.g., gNodeB 112) power consumption and the modeling of the user equipment (e.g., UE 118) power consumption, determine a link energy efficiency applicable to the communication link (e.g., communication link 116). In one or more embodiments, the link energy efficiency can comprise a quantity of successfully transmitted bits per energy unit consumed.

Embodiments herein differ from traditional methods of improving energy efficiency that rely exclusively on switching the BS (e.g., gNodeB 112) on or off, and that are applicable only in very low-traffic demand scenarios. Embodiments herein utilize the concept of link energy efficiency (LEE), and utilize corresponding techniques to improve the LEE, even when the BS (e.g., gNodeB 112) is operating under traffic demands that are not considered negligible. LEE can be defined as a number of successfully transmitted bits per unit energy consumed. Assuming $$E_{bit}^{k}$$

is the total energy expended in supporting the transmission for the $k^{th}$ user payload of $$P_{avg}^{k}$$

bits and further denoting the block error rate (BLER) for the $k^{th}$ user as $BLER^k$, LEE for the $k^{th}$ user as $\beta^k$, the efficiency computation module 204 can execute the following for a transmission frame carrying traffic for N users:

$$\max_{N_t,N_r,\rho_k,\sigma_k} \sum_k \beta^k = \frac{(1-BLER^k) * P_{avg}^k}{E_{bit^k}} \quad \text{(Equation 5)}$$

where $$P_{avg}^{k}$$

is the average block or packet size that is transmitted, and $\rho_k$ and $\sigma_k$ denote respectively the modulation and coding rate to be used for the $k^{th}$ user subject to the following constraints:

1. Throughput Constraint:

$$\gamma^k \geq \gamma_{thresh}^k,$$

where $$\gamma_{thresh}^k$$

is a threshold throughput that is to be sustained in order to meet the latency constraints of the $k^{th}$ user.

2. BLER Constraint: $BLER > BLER_{max}$ where $BLER_{max}$ is a system upper bound on the maximum allowed instantaneous BLER and is to be met as part of the system specifications. For example, for the 3GPP physical shared data channel (PDSCH), it is typically 0.1.

The link parameters to be used are therefore obtained (e.g., via the efficiency computation module 204) as $$[N_t^{opt}, N_t^{opt}, \rho_t^{opt}, \rho_t^{opt}] = \operatorname{argmax} \sum_k \beta^k \quad \text{(Equation 6)}$$

Solving the optimization problem in Equation 6 via a brute force search, given the high dimensionality of the optimization space, would be either computationally infeasible (e.g., no solution can be computed in the stipulated time for link adaptation) or would likely converge to some kind of local minima that would not meet any of the herein noted optimization objectives.

In various embodiments, the link adaptation module 206 can, based on the link energy efficiency, perform link adaptation which can comprise modifying one or more link transmission parameters applicable to the communication link (e.g., communication link 116). In this regard, the modifying can be determined (e.g., via the link adaptation module 206 or another suitable module herein) to increase the link energy efficiency herein.

In one or more embodiments, the link adaptation can be determined (e.g., via the link adaptation module 206) to satisfy a defined throughput constraint applicable to the communication link (e.g., communication link 116). In this regard, the defined throughput constraint can comprise a defined throughput threshold determined (e.g., via the link adaptation module 206) to satisfy a defined latency constraint.

In further embodiments, the link adaptation can be determined (e.g., via the link adaptation module 206) to satisfy a defined BLER constraint applicable to the communication link (e.g., communication link 116). In this regard, the defined BLER constraint can comprise a maximum permitted instantaneous BLER.

Computational Complexity Reduction:

one of the most critical tasks in MIMO processing is to select the appropriate mode to transmit. In additional embodiments, the link transmission parameter can be modified (e.g., via the link adaptation module 206) based on an eigenvalue decomposition of an estimated channel matrix (e.g., via the channel decomposition module 208) applicable to the communication link (e.g., communication link 116). In this regard, the modifying of the link transmission parameters can comprise performing rank adaptation using eigenvalues generated via the eigenvalue decomposition.

In various embodiments herein, an eigenvalue decomposition of the estimated channel matrix H can be performed (e.g., via the channel decomposition module 208). For a TDD system, because channel reciprocity at the BS can be utilized, the foregoing can be performed (e.g., via the channel decomposition module 208) at the BS (e.g., gNodeB 112) with greater resources and by using the SRS pilots, and only need to be performed at the frequency of transmission of the SRS from the UE 118, which can also be set by the BS (e.g., gNodeB 112). Once the eigenvalues of the channel matrix are obtained (e.g., via the channel decomposition module 208), the eigenvalues with a vanishing value can be discarded (e.g., via the channel decomposition module 208), and the channel rank for DL can be limited to R such that:

$$R = \sum_{k=1}^{N_t} I_k \text{ where } I_k = \begin{cases} 1, \text{ if and only if } \vartheta_k > \vartheta_T \\ 0, \quad\quad\quad\quad\quad \text{otherwise} \end{cases} \quad \text{(Equation 7)}$$

where $\vartheta_T$ is a threshold eigenvalue that is determined by both an emphasis on energy efficiency (fewer antenna ports lead to lesser energy consumption) and the minimum modulation to be supported for $$\gamma_{thresh}^{k}.$$

In various embodiments, the link adaptation for the communication link can be performed (e.g., via the link adaptation module 206) further based on a buffer status report (e.g., buffer status report 504) of a traffic buffer applicable to the user equipment (e.g., UE 118). In this regard, the modeling of the user equipment power consumption can be based on a predicted (e.g., via the energy requirement prediction module 216) energy requirement determined (e.g., via the energy requirement prediction module 216) to empty the traffic buffer.

Further, in various embodiments, the link adaptation for the communication link can be performed (e.g., via the link adaptation module 206) further based on a channel quality indicator applicable to the user equipment (e.g., UE 118).

In various embodiments, the channel quality estimation module 210 can estimate a channel applicable to the communication link based on staggered sounding reference signals and demodulation reference signals. For example, estimating the uplink channel from PUSCH DMRS is only possible when PUSCH is scheduled for a given UE (e.g., UE 118). While various embodiments herein use this as a primary means of channel estimation when a UE is scheduled to transmit in the uplink, the uplink slots are relatively less popular in TDD patterns and may not always have valid DMRS transmission. Frequency hopped sounding reference signal (FH-SRS) patterns can be set so that the entire transmission bandwidth is covered in a cyclical fashion, except for the sub-bands that have PUSCH scheduled, as DMRS based channel estimation can be applied to those sub-bands. Since a valid channel estimate is required for the entire band, an interpolation-based approach can be utilized (e.g., via the channel quality estimation module 210) to leverage the estimated channel coefficients from both of these channel estimation approaches with no overlap in frequency. Furthermore, for bands that have had a long interval between channel estimates (not all sub-bands are processed by the channel estimation modules (e.g., channel quality estimation module 210) at every interval), the weight is inversely proportional to interval of channel estimation.

In various embodiments, the energy consumption module 212 can determine a cumulative energy consumption metric. In this regard, the cumulative energy consumption metric can be determined based on a highest suitable modulation and coding scheme to empty a traffic buffer applicable to the user equipment (e.g., UE 118). Further, the frequency selection module 214 can, based on the cumulative energy consumption metric, determine a frequency of the modifying of the link transmission parameter, as later discussed in greater detail.

Higher degrees of freedom can lead to multiple modes in which the radios can operate, and thus selecting (e.g., via the system 102) the best mode out of hundreds of operational modes implicates the optimization of an objective function that is non-trivial. When combined with choosing a mode that optimizes the link energy efficiency as well, the problem of link adaptation becomes an expanded objective, and thus becomes even more confounding for heuristics-based optimization.

Figure 3:
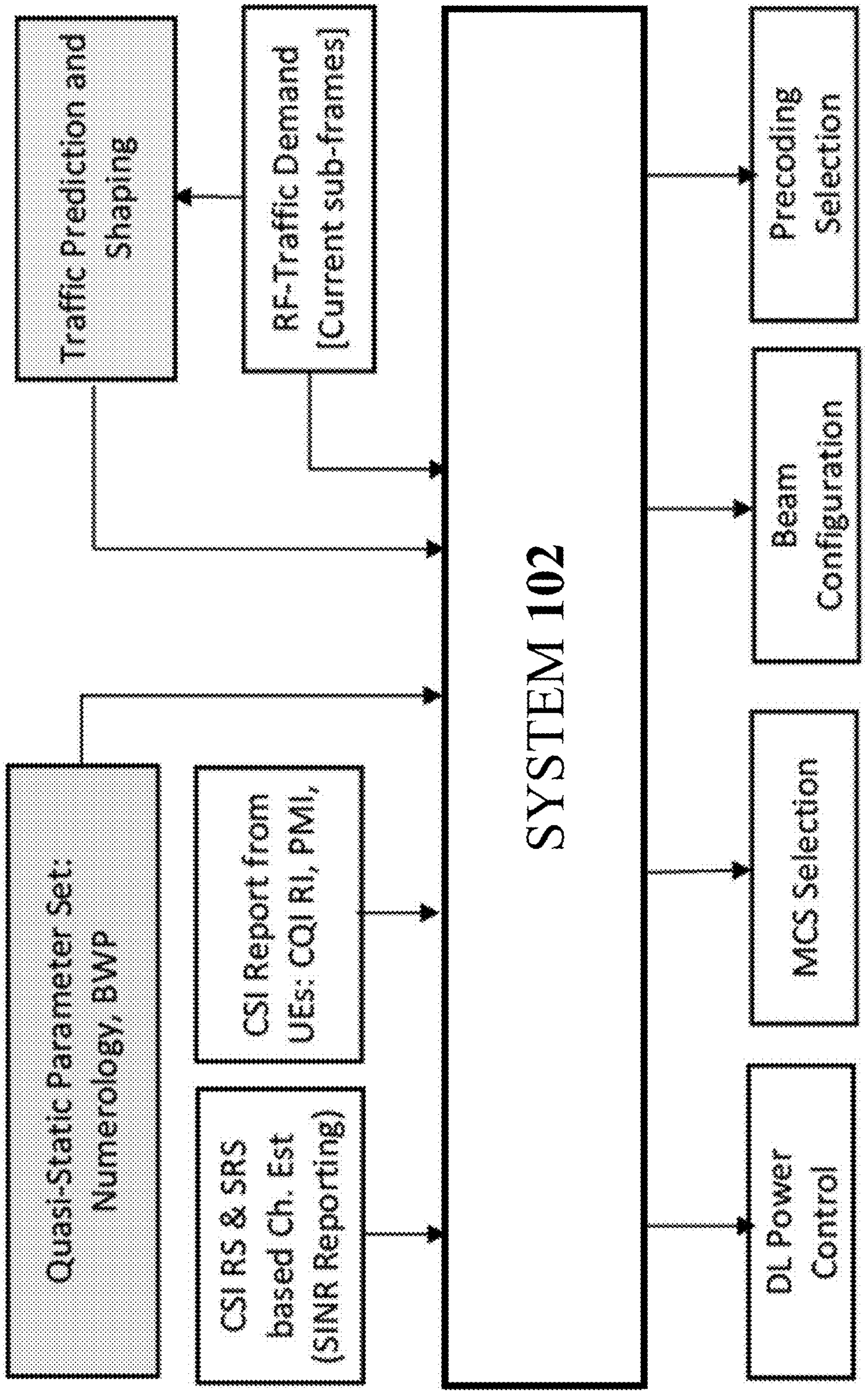
FIG. 3 is a block diagram of a non-limiting example system inputs and outputs in accordance with one or more example embodiments described herein.

In order to provide an example of the complexities of LA for DL transmission, FIG. 3 depicts the various dependencies to consider as inputs with the outputs of the LA process also shown such that the traffic demand for each UE is met as per the channel conditions. It is noted that some of the parameters may not frequently change and are thus categorized as the “quasi-static parameter set” in FIG. 3. Channel quality estimation and SINR reporting, however, occur more frequently, and can potentially occur every sub-frame. It is noted that the exact periodicity of such reporting may also be limited by the system 102 capability, and thus larger periods such as tens or hundreds of sub-frame intervals are also possible to reduce system complexity. It is also noted that the output during MCS selection can potentially change every subframe. However, setting the DL power, beam configuration, and precoding selection may not be as frequent, and the triggers for these can vary according to system design.

Some other challenges to LA may also be posed by the application scenario, for example, the high mobility of UEs in case of V2X (vehicle-to-everything) often leads to outdated CSI that severely degrades LA performance. There could potentially be inter-numerology interference due to the use of mixed numerologies at the same time. Even within the same numerology dynamic TDD modes allow for flexible slots, making interference dynamics more intricate. In addition, the support of URLLC services involves that non latency critical transmission can be interspersed with latency critical services which may worsen LA requirements. All of the above implies that conventional mechanisms for LA may be no longer adequate on 5G and beyond networks.

Capturing the behavior of a wireless transmission channel with limited resources and under practical considerations is a challenging task. In particular, for the wideband channels considered for 5G NR and beyond, the RF front-end effects in combination with the wireless channel can render the end-to-end channel non-linear and thus be difficult to model via analytical means. The wide range of frequencies supported by 5G implies that the propagation mechanism and underlying channel model greatly differ from high and low frequency bands. In particular, for high frequency bands accurate channel estimation tends to be relatively more challenging due to the non-linear nature of the channel. It is noted that, while determination of accurate coefficients might be necessary for equalization, for computation of SINR, this level of accuracy is not needed. However, the evolution of the estimated SINR has to be in line with channel variations. When SRS is not transmitted frequently enough, other means of ensuring that SINR is not overestimated are needed.

It is noted that embodiments herein can apply to any OFDMA systems in general, and to the downlink of cellular systems equipped with multiple antennas in particular. Embodiments herein optimize the link adaptation operation so as to improve the link parameter selection with respect to the chosen criteria of energy efficiency. In this regard, in FIG. 4, the aspects within the downlink data path that are affected by the link adaptation module and effectively determine the energy consumed in enabling the transmission are depicted.

Figure 4:
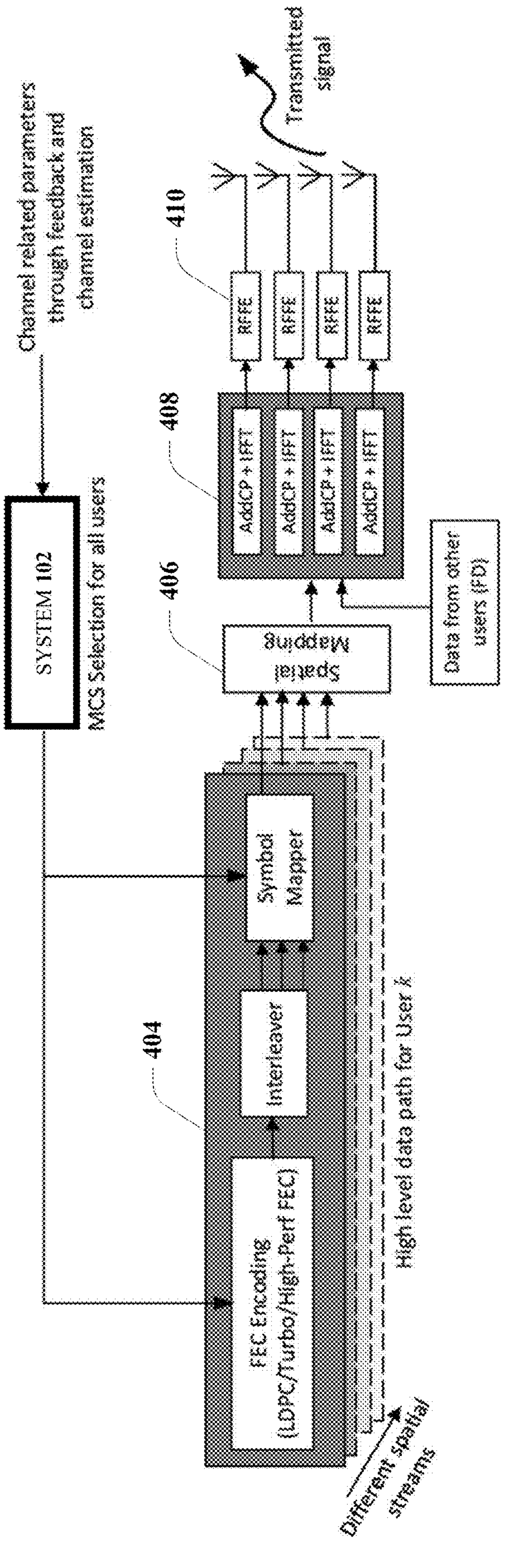
FIG. 4 is a block diagram of a non-limiting example downlink data path in accordance with one or more example embodiments described herein.

FIG. 4 depicts aspects of the baseband data processing for a generic MIMO-OFDM system with $N_t$ transmit antennas, and with UE (receiver) using $N_r$ antennas. At step 404, FEC encoding is performed, an interleaver (e.g., of the system 102) scrambles data, and a symbol mapper (e.g., of the system 102) uses the MCS scheme that has been selected for each user and applies them to the bits to form symbols in the IQ domain. At 406, spatial mapping is performed (e.g., via the system 102) to map the IQ vectors. At 408, inverse fast Fourier transform (IFFT) is performed, and the symbol is now in the time domain to be sent to the RF front-end (RFFE) at 410 to convert the digital signal to an analog signal by applying a suitable conversion and gain for the analog signal to be transmitted from the antenna port (e.g., via antenna 114).

For each of the users (e.g., UEs), the data is encoded (e.g., via system 102) by a standards-defined FEC and mapped with a symbol mapper to achieve bit-interleaved coded modulation (BICM) vector of I and Q symbols which may then be multiplied by a spatial precoding matrix prior to be being converted to time-domain and processed by the RFFE. Each active RFFE consumes power and hence the number of RF paths that are active is to be selected carefully (e.g., via system 102). The data path of all other users scheduled on DL can be the same as shown for user “k” in FIG. 4 and is combined at the IFFT step for each of the antenna ports. The system 102 provides the modulation and coding rates to be used for each user, which can vary independently.

The MCS selection for each user (e.g., UE) is performed (e.g., via system 102) based on the feedback related to the downlink channel that is received by the BS, for instance, through either uplink control channel, whereby each of the UEs send data relevant to the link adaptation process in the form of a channel state information (CSI) report. For time domain duplexing (TDD) links, the BS can further perform channel estimation to derive link parameters from the uplink channel that are useful for DL adaptation due to channel reciprocity.

If the optimal set of link parameters that is obtained through one iteration of optimization can be applied over several transmission frames, then the computational complexity of the optimization can be amortized over ‘N’ such frames that use the same link transmission parameters on a per UE basis. While optimization of the energy efficiency through link transmission parameter adaptation can be a primary goal, embodiments herein can also minimize the compute overhead related to transmission. It is noted that, since different UEs may be experiencing different rates of change of the channel, the duration for which such parameters may be considered optimal is also different. As an operational compromise between being able to respond to changes in channel behavior and reduced computational overhead, various embodiments herein can utilize the following set of steps to be followed for estimation (e.g., via the frequency selection module 214) of the frequency of adaptation of link parameters to optimize energy efficiency.

A cumulative energy consumption metric $\tau_{EC}$ is computed that is used in conjunction with the throughput maximization strategy where $\tau_{EC}$ is computed over ‘$N_k$’ frames for the $k^{th}$ user such that the $N_k$ frames are sufficient to service the entirety of the transmit buffer for that user as reported in the BSR database. Embodiments herein can assume a finite buffer length for each of the user and BUFFER_LEN_MAX places a hard limit on the buffer length for each of the users that are connected to the BS and have requested traffic on the downlink from the BS, regardless of whether the user is scheduled to receive traffic in the current frame or not.

In scheduling a given user, the BS uses the recommended CQI from UE if hybrid ARQ (automatic repeat request) (HARQ) re-transmit counter for the corresponding service/data flow is 0 (i.e., no negative acknowledgements (NACKs) have been received for the previously used CQI if this is the not the first transmission to the user) otherwise the BS uses the CQI obtained from the SNR-to-CQI mapping table with the SNR computed from uplink channel estimation in the TDD mode. A CQI that is lower than the one recommended by the UE is used if the HARQ re-transmit counter is above a certain threshold, HARQ_thresh, at which the BS is required to take action on the MCS selection as per its own link adaptation policy.

$\tau_{EC}$ is then computed considering the highest suitable MCS and different MIMO combinations over several frames such that it empties the entirety of the current traffic buffer for a given UE and the set of parameters that leads to the minimum cumulative energy metric is then selected for that user.

Figure 5:
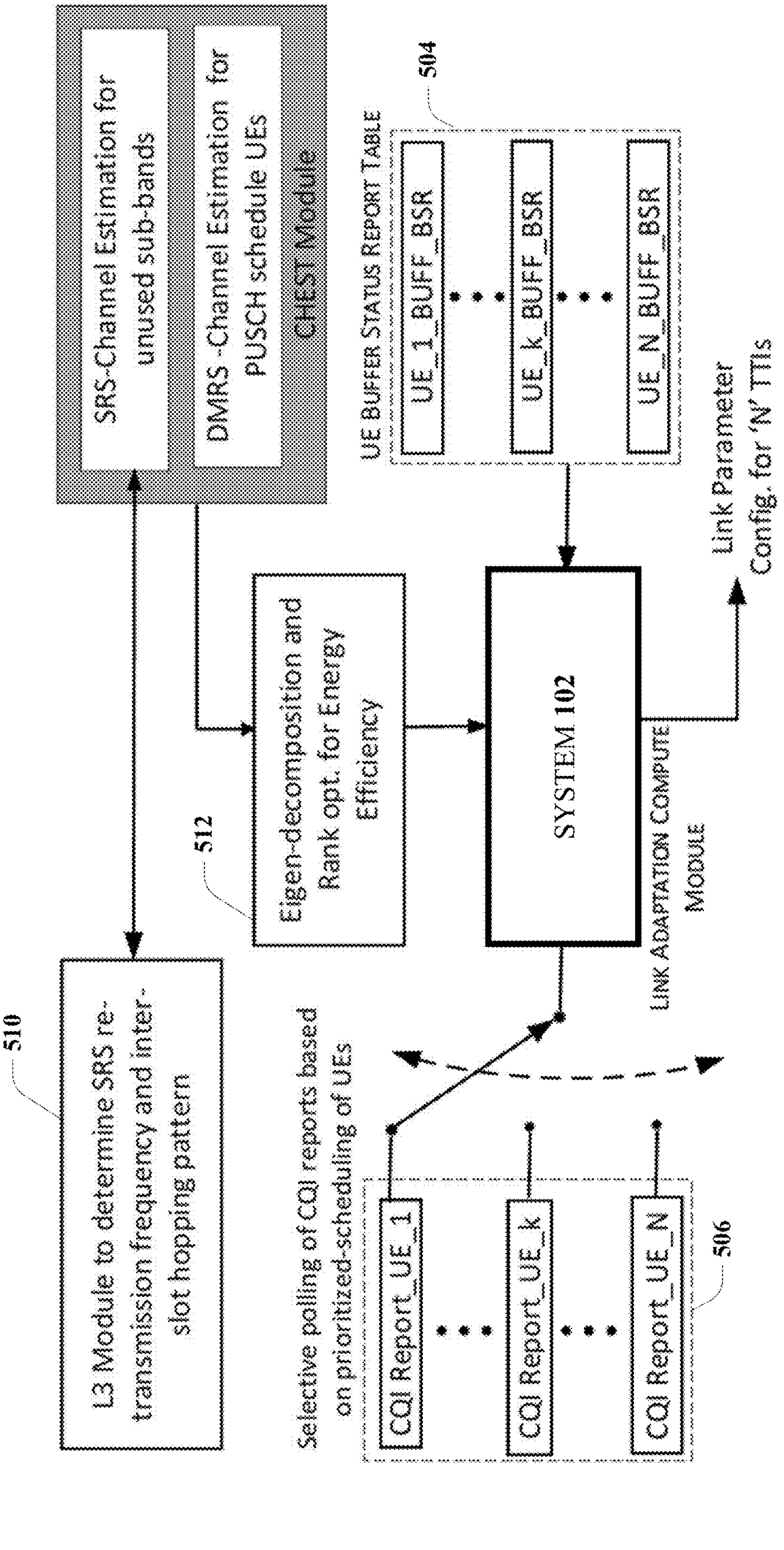
FIG. 5 is a process diagram for a process associated with energy efficient link adaptation in accordance with one or more example embodiments described herein.

With reference to FIG. 5, an example of how various embodiments herein operate in the context of a practical 5G NR specifications compliant BS design is provided. It is noted that that not all aspects of the protocol related to control and data transmission are shown in FIG. 5. In particular, FIG. 5 shows a high-level block diagram of the functional flow of information and data in order to actuate the inventive aspects of various embodiments herein. The uplink channel estimation (CHEST) module (e.g., channel decomposition module 208) provides the estimated channel matrix H for the sub-carriers that are to be used for by the scheduler for link adaptation herein. The channel decomposition module 208 can thus utilize the SRS signals that are sent with a certain periodicity to do a wideband estimation of the channel. In particular, When an estimate of the UL channel is obtained through SRS-based CHEST, the SRS hopping pattern and frequency is pre-determined by L3 module 510 (e.g., of the system 102 or communicatively coupled to the system 102) for radio resource management (RRM) purposes.

For the portion of the bandwidth that is being used actively for PUCCH and PUSCH, DMRS is used for channel estimation, and this is specifically used for coherent demodulation of the uplink data, but the channel estimates can nonetheless be passed on to the LA modules to leverage the typical quasi-static behavior of the channel. It is noted that, when UEs are scheduled on a set of PUSCH RBs, no SRS is scheduled for these RB groups.

With reference to FIG. 5, the majority of the decision-making is facilitated by the system 102. However, several important data need to be collected and reconciled to make the most informed decision given the data that is optimal per the criteria set forth in Equation 5. For instance, two primary data elements are the per-UE CQI report 506 and the buffer status report (BSR) 504 for each of the UEs that receives data in DL. Additionally, the computational complexity reduction approach described herein also requires the determination of the eigenvectors of the channel matrix at 512 (e.g., via the channel decomposition module 208).

When the relevant inputs are all available, the mode that satisfies the throughput requirement is selected (e.g., via the system 102). It is noted that, in one or more nonlimiting embodiments herein, one or more procedural updates are omitted, and the learning approaches still apply independently.

Some embodiments for the computation of the energy consumption metric may bypass the computation of the BB processing related contribution as the radio power consumption is typically an order of magnitude higher than BB processing. An alternative embodiment may make use of the UE reported CQI to select MCS only and consider EE optimization through selection of MIMO modes only.

When appropriate, a scheduler herein (e.g., of the system 102) can pack all data along the frequency domain first before allocating resources in the time domain to create more opportunities for symbol blanking and thus lower power consumption.

Figure 6:
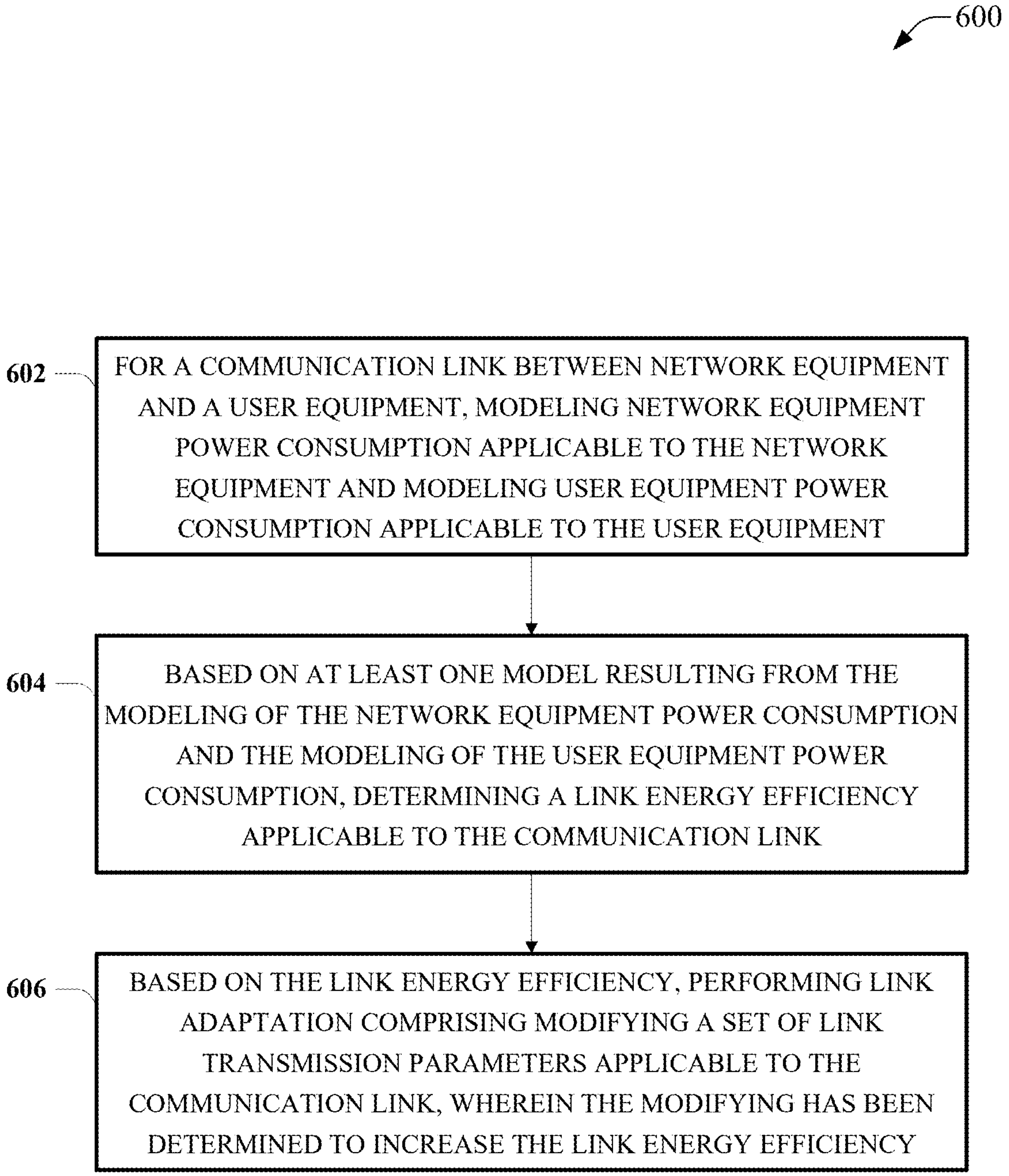
FIG. 6 is a flow diagram for a process associated with energy efficient link adaptation in accordance with one or more example embodiments described herein.

FIG. 6 illustrates a flow diagram for a process 600 associated with energy efficient link adaptation in accordance with one or more embodiments described herein. At 602, the process 600 can comprise, for a communication link (e.g., communication link 116) between network equipment (e.g., gNodeB 112) and a user equipment (e.g., UE 118), modeling (e.g., via the modeling module 202) network equipment power consumption applicable to the network equipment (e.g., gNodeB 112) and modeling (e.g., via the modeling module 202) user equipment power consumption applicable to the user equipment (e.g., UE 118). At 604, the process 600 can comprise, based on at least one model resulting from the modeling of the network equipment power consumption and the modeling of the user equipment power consumption, determining (e.g., via the efficiency computation module 204) a link energy efficiency applicable to the communication link (e.g., communication link 116). At 606, the process 600 can comprise, based on the link energy efficiency, performing (e.g., via the link adaptation module 206) link adaptation comprising modifying a set of link transmission parameters applicable to the communication link, wherein the modifying has been determined (e.g., via the link adaptation module 206 and/or efficiency computation module 204) to increase the link energy efficiency.

Figure 7:
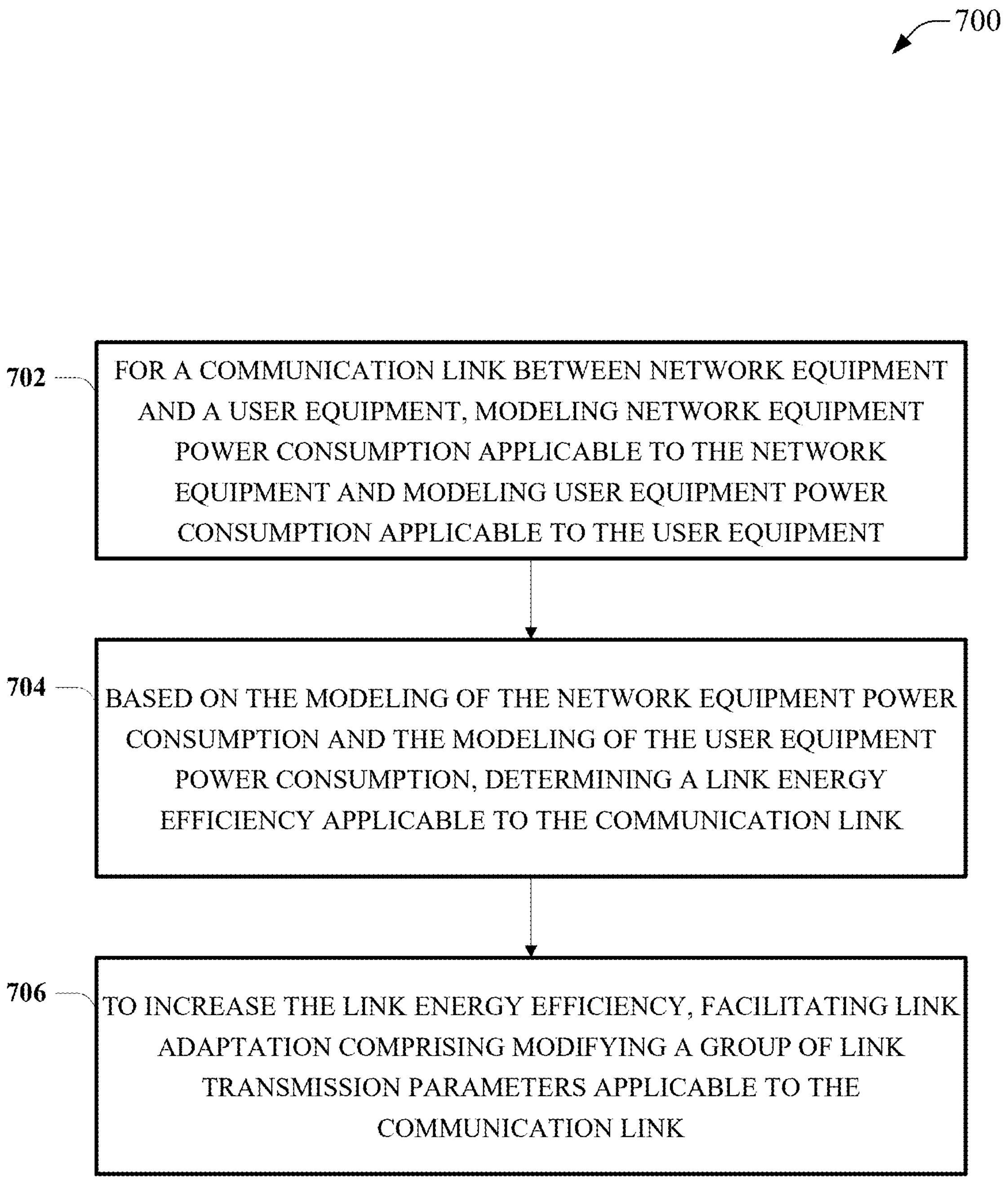
FIG. 7 is a flow diagram for a process associated with energy efficient link adaptation in accordance with one or more example embodiments described herein.

FIG. 7 illustrates a flow diagram for a process 700 associated with energy efficient link adaptation in accordance with one or more embodiments described herein. At 702, the process 700 can comprise, for a communication link (e.g., communication link 116) between network equipment (e.g., gNodeB 112) and a user equipment (e.g., UE 118), modeling (e.g., via the modeling module 202) network equipment power consumption applicable to the network equipment (e.g., gNodeB 112) and modeling (e.g., via the modeling module 202) user equipment power consumption applicable to the user equipment (e.g., UE 118). At 704, the process 700 can comprise, based on the modeling of the network equipment power consumption and the modeling of the user equipment power consumption, determining (e.g., via the efficiency computation module 204) a link energy efficiency applicable to the communication link (e.g., communication link 116). At 706, the process 700 can comprise, to increase the link energy efficiency, facilitating (e.g., via the link adaptation module 206) link adaptation comprising modifying a group of link transmission parameters applicable to the communication link (e.g., communication link 116).

Figure 8:
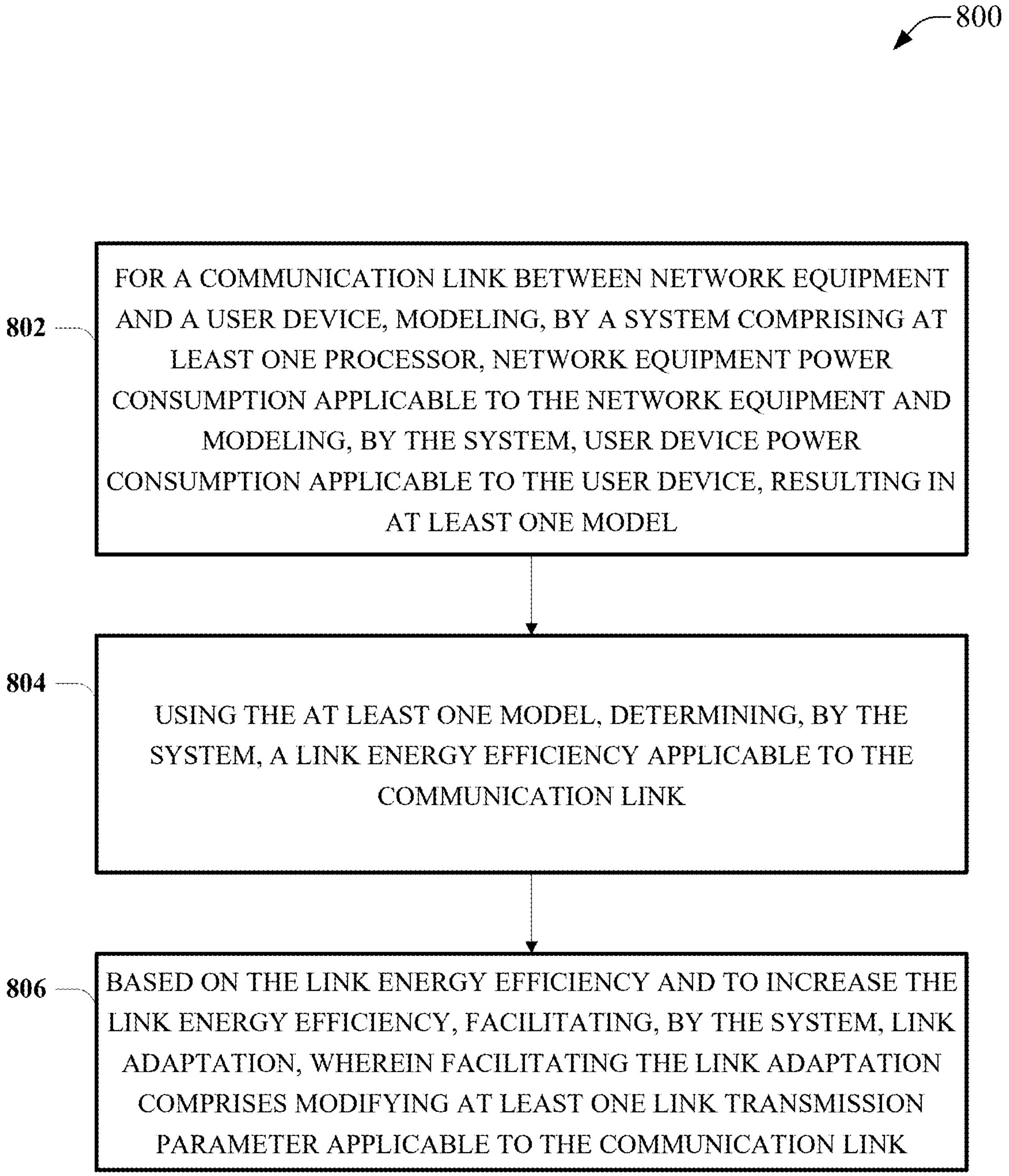
FIG. 8 is a flow diagram for a process associated with energy efficient link adaptation in accordance with one or more example embodiments described herein.

FIG. 8 illustrates a flow diagram for a process 800 associated with energy efficient link adaptation in accordance with one or more embodiments described herein. At 802, the process 800 can comprise, for a communication link (e.g., communication link 116) between network equipment (e.g., gNodeB 112) and a user device (e.g., UE 118), modeling (e.g., via the modeling module 202) network equipment power consumption applicable to the network equipment (e.g., gNodeB 112) and modeling (e.g., via the modeling module 202) user device power consumption applicable to the user device (e.g., UE 118). At 804, the process 800 can comprise, using the at least one model, determining (e.g., via the efficiency computation module 204) a link energy efficiency applicable to the communication link (e.g., communication link 116). At 806, the process 800 can comprise, based on the link energy efficiency and to increase the link energy efficiency, facilitating (e.g., via the link adaptation module 206) link adaptation, wherein facilitating the link adaptation comprises modifying at least one link transmission parameter applicable to the communication link (e.g., communication link 116).

Figure 9:
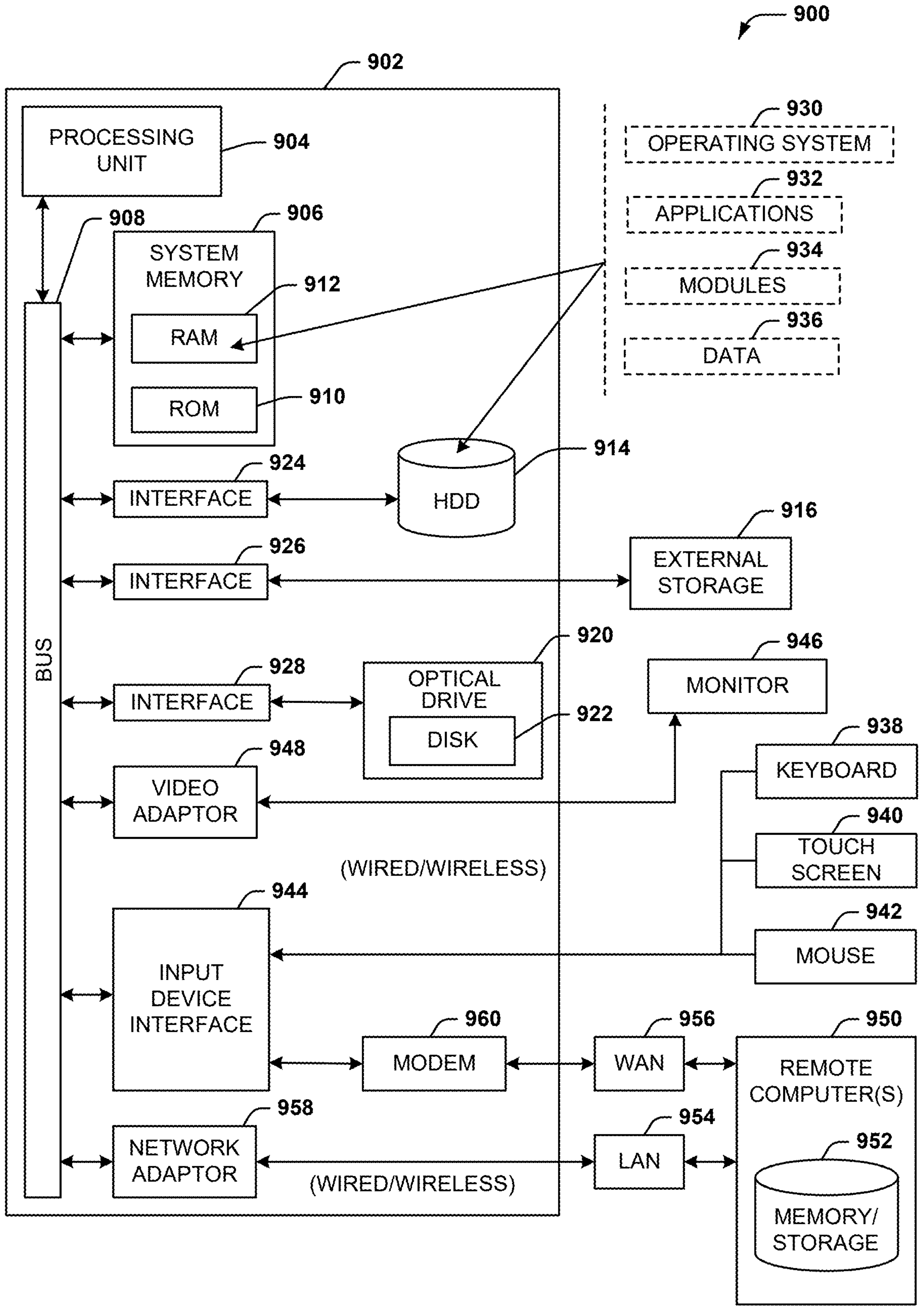
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, modules, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can also be connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
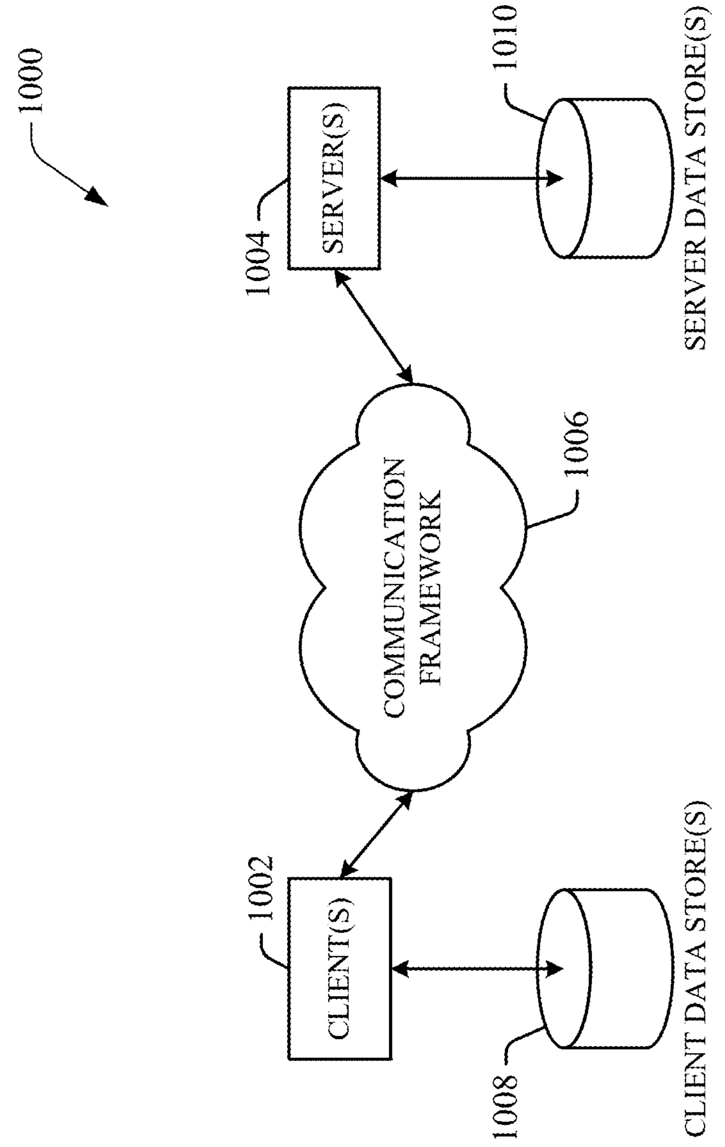
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed files to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components, modules, or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, modules, devices, circuits, systems, etc., the terms (including a reference to a "means") used to describe such components or modules are intended to also include, unless otherwise indicated, any structure(s) which performs the specified function of the described component or module (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

for a communication link between network equipment and a user equipment, modeling network equipment power consumption applicable to the network equipment and modeling user equipment power consumption applicable to the user equipment;

based on at least one model resulting from the modeling of the network equipment power consumption and the modeling of the user equipment power consumption, determining a link energy efficiency applicable to the communication link;

estimating a channel quality of the communication link;

based on a buffer status report of a traffic buffer applicable to the user equipment, predicting an energy requirement determined to empty the traffic buffer;

further determining the link energy efficiency by jointly processing the channel quality and the energy requirement, resulting in a jointly determined link energy efficiency; and based on the jointly determined link energy efficiency, performing link adaptation comprising modifying a set of link transmission parameters applicable to the communication link.

2. The system of claim 1, wherein the link energy efficiency comprises a quantity of successfully transmitted bits per energy unit consumed.

3. The system of claim 1, wherein the link adaptation is determined to satisfy a defined throughput constraint applicable to the communication link.

4. The system of claim 3, wherein the defined throughput constraint comprises a defined throughput threshold determined to satisfy a defined latency constraint.

5. The system of claim 1, wherein the link adaptation is determined to satisfy a defined block error rate constraint applicable to the communication link.

6. The system of claim 5, wherein the defined block error rate constraint comprises a maximum permitted instantaneous block error rate.

7. The system of claim 1, wherein the set of link transmission parameters are modified based on an eigenvalue decomposition of an estimated channel matrix applicable to the communication link, and wherein the performing the link adaptation comprises performing rank adaptation using eigenvalues generated via the eigenvalue decomposition.

8. The system of claim 1, wherein the operations further comprise:

estimating a channel applicable to the communication link based on staggered sounding reference signals and demodulation reference signals.

9. The system of claim 1, wherein the operations further comprise:

determining a cumulative energy consumption metric, wherein the cumulative energy consumption metric is determined based on a highest suitable modulation and coding scheme to empty the traffic buffer applicable to the user equipment; and based on the cumulative energy consumption metric, determining a frequency of the performing the link adaptation.

10. The system of claim 1, wherein the link adaptation for the communication link is performed further based on a channel quality indicator applicable to the communication link.

11. The system of claim 1, wherein the link adaptation for the communication link is performed further based on the buffer status report, and wherein the modeling of the user equipment power consumption is based on a predicted energy requirement determined to empty the traffic buffer.

12. A non-transitory machine-readable storage medium, comprising executable instructions that, when executed by at least one processor, facilitate performance of operations, comprising:

for a communication link between network equipment and a user equipment, modeling network equipment power consumption applicable to the network equipment and modeling user equipment power consumption applicable to the user equipment;

based on the modeling of the network equipment power consumption and the modeling of the user equipment power consumption, determining a link energy efficiency applicable to the communication link;

estimating a channel quality of the communication link;

based on a buffer status report of a traffic buffer applicable to the user equipment, predicting an energy requirement determined to empty the traffic buffer;

further determining the link energy efficiency by jointly processing the channel quality and the energy requirement, resulting in a jointly determined link energy efficiency; and to increase the jointly determined link energy efficiency, facilitating link adaptation comprising modifying a group of link transmission parameters applicable to the communication link.

13. The non-transitory machine-readable storage medium of claim 12, wherein the link energy efficiency comprises a quantity of successfully transmitted bits per energy unit consumed.

14. The non-transitory machine-readable storage medium of claim 12, wherein link adaptation is determined to satisfy a defined throughput constraint applicable to the communication link.

15. The non-transitory machine-readable storage medium of claim 14, wherein the defined throughput constraint comprises a defined throughput threshold determined to satisfy a defined latency constraint.

16. The non-transitory machine-readable storage medium of claim 12, wherein link adaptation is determined to satisfy a defined block error rate constraint applicable to the communication link.

17. The non-transitory machine-readable storage medium of claim 16, wherein the defined block error rate constraint comprises a maximum permitted instantaneous block error rate.

18. A method, comprising:

for a communication link between network equipment and a user device, modeling, by a system comprising at least one processor, network equipment power consumption applicable to the network equipment and modeling, by the system, user device power consumption applicable to the user device, resulting in at least one model;

using the at least one model, determining, by the system, a link energy efficiency applicable to the communication link;

estimating, by the system, a channel quality of the communication link;

based on a buffer status report of a traffic buffer applicable to the user device, predicting, by the system, an energy requirement determined to empty the traffic buffer;

further determining, by the system, the link energy efficiency by jointly processing the channel quality and the energy requirement, resulting in a jointly determined link energy efficiency; and based on the jointly determined link energy efficiency and to increase the link energy efficiency, facilitating, by the system, link adaptation, wherein facilitating the link adaptation comprises modifying at least one link transmission parameter applicable to the communication link.

19. The method of claim 18, wherein the at least one link transmission parameter is modified based on an eigenvalue decomposition of an estimated channel matrix applicable to the communication link.

20. The method of claim 18, furthering comprising:

estimating, by the system, a channel applicable to the communication link based on staggered sounding reference signals and demodulation reference signals.

* * * * *